(12) United States Patent
Kerry

(10) Patent No.: US 11,973,673 B2
(45) Date of Patent: *Apr. 30, 2024

(54) EDGE SYSTEM HEALTH MONITORING AND AUDITING

(71) Applicant: NCR Voyix Corporation, Atlanta, GA (US)

(72) Inventor: John William Kerry, Marietta, GA (US)

(73) Assignee: NCR Voyix Corporation, Atlanta, GA (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/121,431

(22) Filed: Mar. 14, 2023

(65) Prior Publication Data

US 2023/0216765 A1    Jul. 6, 2023

Related U.S. Application Data

(63) Continuation of application No. 17/951,805, filed on Sep. 23, 2022, now Pat. No. 11,658,893, which is a continuation of application No. 17/341,693, filed on Jun. 8, 2021, now Pat. No. 11,469,982, which is a continuation of application No. 16/426,927, filed on May 30, 2019, now Pat. No. 11,133,997.

(51) Int. Cl.
*H04L 43/0817* (2022.01)
*G06F 11/00* (2006.01)
*G06F 11/32* (2006.01)
*G06F 11/34* (2006.01)

(52) U.S. Cl.
CPC ........ *H04L 43/0817* (2013.01); *G06F 11/008* (2013.01); *G06F 11/327* (2013.01); *G06F 11/328* (2013.01); *G06F 11/3476* (2013.01)

(58) Field of Classification Search
CPC .. H04L 43/0817; G06F 11/008; G06F 11/327; G06F 11/328; G06F 11/3476; G06F 11/3006; G06F 11/3055
See application file for complete search history.

(56) References Cited

U.S. PATENT DOCUMENTS 8,936,198 B1 \* 1/2015 Eddey ................ G06Q 10/0875
                                                                235/487
10,135,916 B1 \* 11/2018 Farhangi ............. H04L 67/1008
(Continued)

*Primary Examiner* — Javier O Guzman
(74) *Attorney, Agent, or Firm* — Schwegman Lundberg & Woessner, P.A.

(57) ABSTRACT

Various embodiments herein each include at least one of systems, methods, software, and devices for edge system health monitoring and auditing. One embodiment, in the form of a method includes performing a system audit over a first network of devices deployed within the facility to determine a status of each respective device. This embodiment further includes determining an overall system status for the facility based on results of the system audit including consideration of a status of each of the devices deployed within the facility and storing data representative of the overall system status of the facility. This embodiment also transmits at least a portion of the data representative of the overall system status of the facility over a second network to a facility system status monitoring application which may then present a single indicator of the overall system status or health.

20 Claims, 5 Drawing Sheets

(56) References Cited

U.S. PATENT DOCUMENTS

| | | | | |
|---|---|---|---|---|
| 2001/0021897 A1* | 9/2001 | Voigt | ................... | G05B 15/02 |
| | | | | 702/89 |
| 2004/0015619 A1* | 1/2004 | Brown | ................... | H04L 43/00 |
| | | | | 710/19 |
| 2009/0164811 A1* | 6/2009 | Sharma | .............. | H05K 7/20836 |
| | | | | 708/445 |
| 2012/0321052 A1* | 12/2012 | Morrill | .............. | H04L 12/5692 |
| | | | | 379/32.01 |
| 2017/0353544 A1* | 12/2017 | Lala | ........................ | H04L 69/40 |

* cited by examiner

EDGE SYSTEM HEALTH MONITORING AND AUDITING

CROSS-REFERENCE TO RELATED APPLICATION

This application is a continuation of U.S. patent application Ser. No. 17/951,805, filed Sep. 23, 2022, which is a continuation of U.S. patent application Ser. No. 17/341,693, filed Jun. 8, 2021, which is a continuation of U.S. patent application Ser. No. 16/426,927, filed May 30, 2019, which application and publication is incorporated herein by reference in its entirety.

BACKGROUND INFORMATION

Various entities, such as restaurants, small businesses, stores, and the like have computer systems that integral in their operations. These computer systems often include many devices, such as point-of-sale (POS) terminals, smart scales that print barcode tags to place on items sold by weight, table top devices, handheld computing devices, and the like. Maintaining these numerous devices can be difficult and when problem arises personnel are often not skilled to resolve the issue or to identify small issues that arise that may lead to bigger issues if the small issues are not resolved. This can result in system downtime, lost sales, and diminished profitability due simply to downtime of technical systems.

SUMMARY

Various embodiments herein each include at least one of systems, methods, software, and devices for edge system health monitoring and auditing.

One embodiment, in the form of a method that may be performed in part on a server remote from a facility includes performing a system audit over a first network of devices deployed within the facility to determine a status of each respective device. This embodiment further includes determining an overall system status for the facility based on results of the system audit including consideration of a status of each of the devices deployed within the facility and storing data representative of the overall system status of the facility. This embodiment also transmits at least a portion of the data representative of the overall system status of the facility over a second network to a facility system status monitoring application which may then present a single indicator of the overall system status or health.

An embodiment that may be in the form of a method, such as may be performed by a system status monitoring application, includes receiving system status data via a first network by a facility system status monitoring application that executes on a dedicated device from a remote system monitoring service. In such embodiments, the system status provides an indicator of an overall system status for a facility based on results of a system audit performed over a second network by the remote system monitoring service and including consideration of a status of each of a plurality of devices deployed within the facility. The method then presents an interface on the dedicated device including an indicator of the overall system status of the facility based on the received system status data.

A further embodiment in the form of a device, such as a device on which a facility system status monitoring application may execute, includes a wireless data subscription service data transceiver, such as to send and receive data over what is commonly referred to as a "cellular network." The device further includes a display, an input device, a processor, and a memory storing instructions of a facility status monitoring application executable by the processor to perform data processing activities. The data processing activities may include receiving system status data via the wireless data subscription service data transceiver over a first network from a remote system monitoring service. The system status of such embodiments provides an indicator of an overall system status for a facility based on results of a system audit performed over a second network by the remote system monitoring service and including consideration of a status of each of a plurality of devices deployed within the facility. The data processing activities further include presenting an interface on the display including an indicator of the overall system status of the facility based on the received system status data.

DETAILED DESCRIPTION

Figure 1:
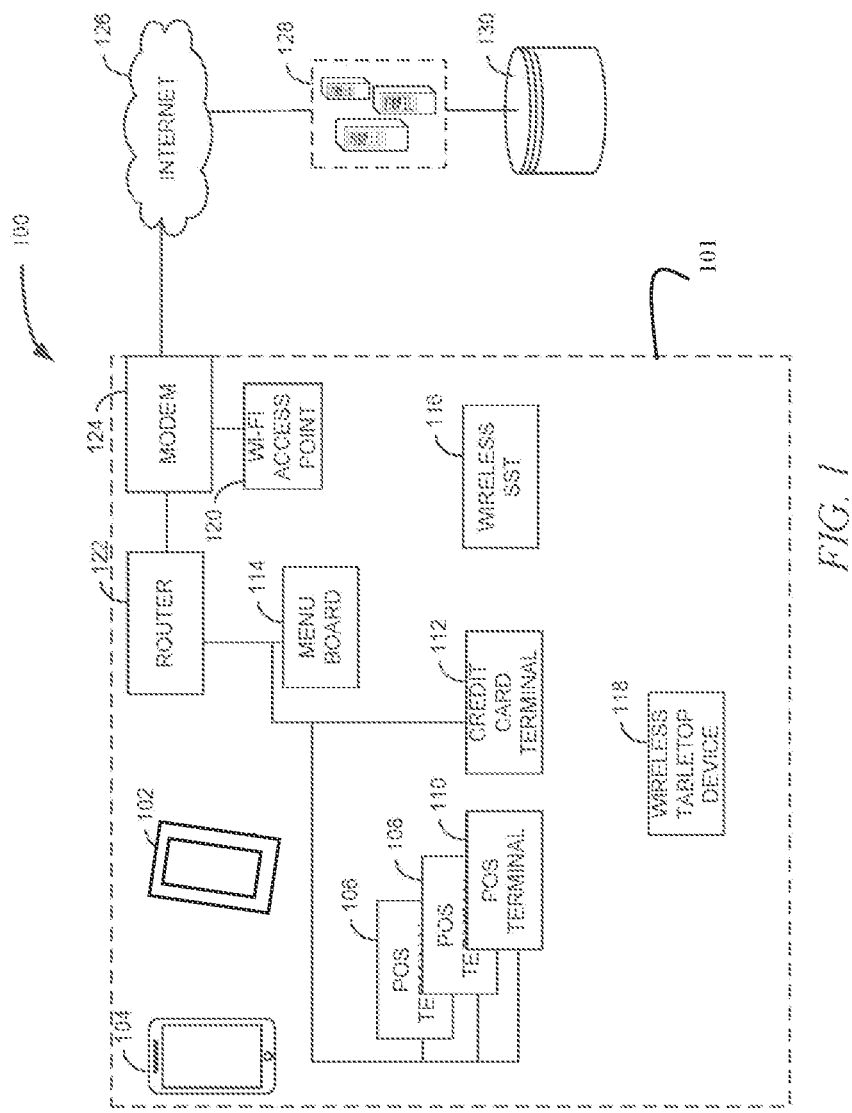
FIG. 1 is a logical block diagram of a system architecture, according to an example embodiment.

Various embodiments herein each include at least one of systems, methods, software, and devices for edge system health monitoring and auditing. With regard to such embodiments, store site management, such as restaurant managers, are often left in the dark on the health status of the store computing systems, in particular on the edge where the store interfaces with customers where system performance matters most. Embodiments herein are deployed with advanced capabilities to audit systems health and report issues as they are identified, which in some embodiments that include real-time monitoring, issues are identified and report essentially the moment they happen. Some embodiments herein include an interface presented on-site that notifies edge-location management, e.g., store and restaurant managers, the moment things are wrong, the ability to trigger a systems audit on demand with a simple input, and acknowledge an active incident with a minimal amount of investment and training to enable edge-location management to keep their business moving with confidence that system providers and servicers are aware of and working to resolve their issues.

Some embodiments include a wireless subscription-based, often referred to as a 'cellular', data network connected device, with a physical light or graphical user interface presented on a display indicating system health. Some such devices may also include physical interface item (e.g., a button) or a graphical user interface item selectable by a human, such as with a mouse or on a touch screen, to trigger a system health audit at the site. This device in some embodiments utilizes application programming interface (API) connections to directly to sensor/agent driven system health monitoring and alerting for edge and data center resources to ascertain system health and trigger system audits remotely. In other embodiments, a triggering of the system health audit at the site through the device may cause the device to send a signal, over the wireless connection that is distinct from a connection at the site where the device is deployed, to a customer system support system to then perform the audit via another network. The device and sensor/agent elements interact with existing customer system support systems, such as may be cloud-based or otherwise operate in a distributed networked computing environment.

In conventional computing scenarios, issues are identified on site and reported from sites to system providers and servicers. The various embodiments herein turn this paradigm around and the system provider or servicer monitoring site systems instead notifies site management of the issue, often before the site management has even detected an issue. As a result, site management is reassured of system provider and servicer attention to their concerns and needs.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100 architecture, according to an example embodiment. The embodiment of the system 100 illustrated in FIG. 1 includes devices and systems deployed at a facility 101 site that is connected to a wide area network, such as the Internet 126. Also connected to the Internet is a monitoring system of system providers and servicers including a service monitoring server 128 and a database 130 that are utilized to track and monitor devices and systems deployed a facilities, such as the facility 101 which in the illustrated embodiment may be a store or restaurant.

The facility 101 includes a connection to the Internet 126 with a modem 124. A local area network (LAN) at the facility is established and maintained by a router 122 that connects to the modem 124. The router 122 may be a WI-FI® enabled router or one or more WI-FI® access points 120 may be connected to the LAN.

Also connected to the facility 101 LAN are devices and systems such as a networked menu board 114, one or more point-of-sale (POS) terminals 106, 108, 110, a payment/credit card terminal 112, and a self-service terminal (SST) 116. The SST may be a self-service POS terminal, an informational kiosk, or other such SST. In some embodiments, other self-service device types may also be present, such as tabletop devices 118 that allow restaurant guests to order and pay from their table or other location. Further devices of some embodiments may include mobile devices 104, such as mobile phones, smartwatches, tablets, and other such devices that may be deployed for a variety of purposes. Each of such devices deployed at the facility 101 may be connected to the LAN via a wired connection to the router 122 or wirelessly via a wireless access point 120.

Each of the various devices deployed at the facility generally have a purpose. While some devices are typically more critical than others, each is still important. Typically when a device has a problem, the problem is resolve only when the right personnel are notified and then either fix the issue or request assistance from higher maintenance echelon support staff or suppliers and servicers. This type of arrangement typically results in lag time in reporting issues. To resolve this issue, devices of various types now often include agent software that monitors and reports their status and issue that arise of the LAN and Internet 126 to the service monitoring server 128 which stores a record of device status information in a database 130. The service monitoring server also includes at least one process that reports received and detected facility 101 device and system status information to a health monitoring device 102 located at the facility.

The health monitoring device 102 is generally a stand-alone device that is able to communicate data with the service monitoring server 128 via a wireless subscriber data network, such as is commonly referred to in the United States of American as a "cellular" network. The health monitoring device 102 may also be connected to the LAN at the facility, but the wireless subscriber data network or other secondary network connectivity independent of the LAN is included in the various embodiments to enable connectivity between the health monitoring device 102 and the service monitoring server 128 even if the LAN, router 122, modem 124, WI-FI® access point 120, the Internet 126, or other data connectivity device or connection between the facility and the service monitoring server 128 are down.

The health monitoring device 102 includes an interface to present facility device and system status information to personnel at the facility. This information is presented based on data received from the service monitoring server 128 that is derived from status updates received thereby from facility 101 devices. The status information presented by the health monitoring device 102, in some embodiments, is a single indicator derived from an aggregation of status information of all facility 101 devices. For example, a green light or symbol may indicate all systems and devices are operating normally, yellow may indicate some non-critical issues, and red may indicate a critical issue. Of note is that the status, coming from the service monitoring server 128, assures facility 101 personnel that the issue has been identified and personnel are working to address the issue or may be reaching out to facility 101 personnel with instructions for resolving the issue.

The health monitoring device 102, in some embodiments, may also include an input, such as a button or a soft button present on a screen of the device that may be selected by a pointing device such as a mouse or with a finger on a touch screen to trigger a facility 101 device and system audit. Selection of this item will cause an instruction to be sent to the service monitoring server 128 which then may poll each or select devices and systems at the facility to determine a current status and then update the health monitoring device 102.

Figure 2:
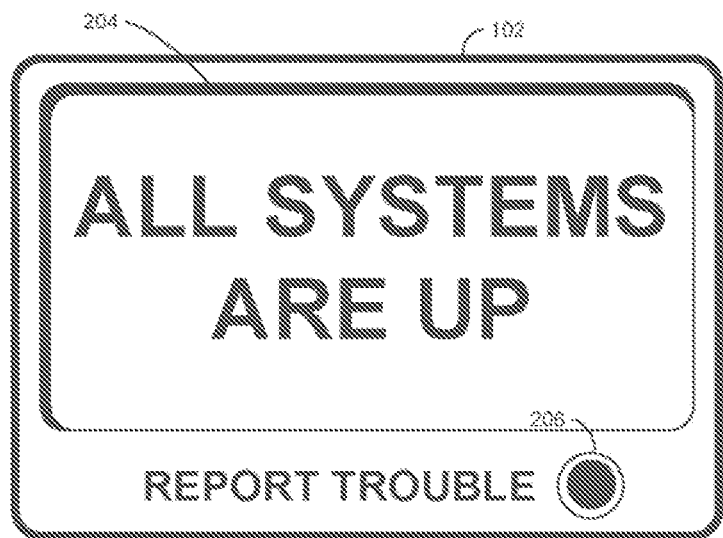
FIG. 2 is an illustration of a device, according to an example embodiment.

FIG. 2 is an illustration of a device, such as a health monitoring device 102 according to an example embodiment. The health monitoring device 102, as illustrated, includes a display 204 on which facility device and system status information is presented. The health monitoring device 102 may also include an issue reporting button 206, which may be a physical, dedicated button or a soft button presented on the display 204.

In some embodiments, the health monitoring device is a special purpose built device. In other embodiments, a device may be tailored to the purposes of the embodiments herein, such as tailoring of an Adafruit PyPortal with a CircuitPython Powered Internet Display available from Adafruit Industries, LLC of New York, New York. In other embodiments, the device may be a mobile device with an app that executes thereon that provides the Health Monitoring Device 102 functionality.

Figure 3:
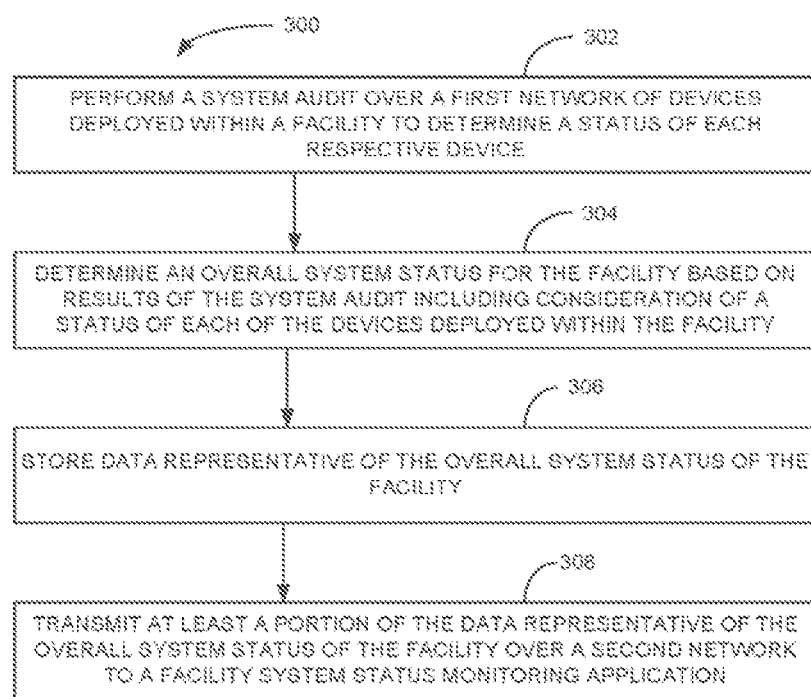
FIG. 3 is a logical block diagram of a method, according to an example embodiment.

FIG. 3 is a logical block diagram of a method 300, according to an example embodiment. The method 300 is an example of a method that may be performed by a process or module or the service monitoring server 128 with regard to devices and systems deployed at the facility 101 of FIG. 1.

The example method 300 of FIG. 3 includes performing 302 a system audit over a first network of devices deployed within a facility to determine a status of each respective device. The method 300 further includes determining 304 an overall system status for the facility based on results of the system audit including consideration of a status of each of the devices deployed within the facility. Once determined 304, the method 300 includes storing 306 data representative of the overall system status of the facility which at least a portion is subsequently transmitted 308 over a second network to a facility system status monitoring application.

In some method 300 embodiments, device data defining the devices deployed within the facility for which a status is to be determined 304 is stored in a database associated by data identifying the facility to which the respective devices are deployed. In some such embodiments, performing 302 the system audit includes retrieving at least a portion of the device data from the data for the devices deployed within the facility and transmitting, over the first network, a device status request to each device identified in the retrieved device data. In some of these embodiments, transmitting a device status request to each device includes a call to agents deployed on the respective devices, each agent callable in the same manner regardless of a type of the respective devices, the agents tailored for execution on the type of device on which they are deployed. In response to the device state requests, these embodiments also include receiving, via the first network, a reply including a device status or not receiving a reply indicating a negative device status with regard to each device to which a device status request was transmitted.

Figure 4:
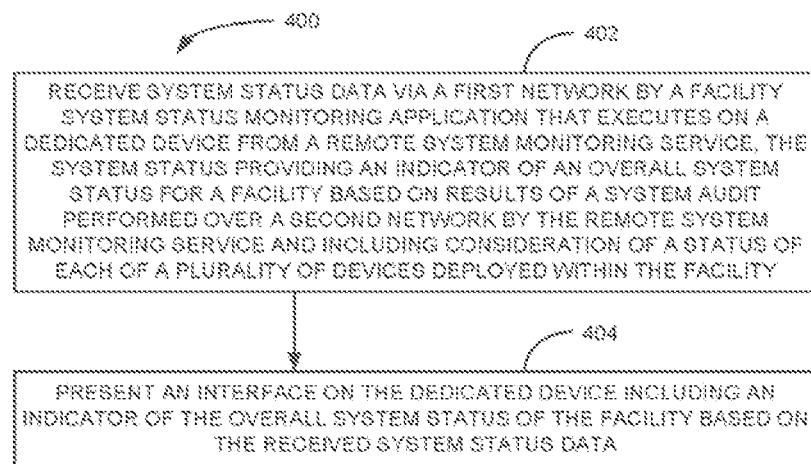
FIG. 4 is a logical block diagram of a method, according to an example embodiment.

FIG. 4 is a logical block diagram of a method 400, according to an example embodiment. The method 400 is an example of a method that maybe be performed by a facility system status monitoring application executes on a dedicated device, such as the health monitoring device 102 of FIG. 1. The method 400 includes receiving 402 system status data via a first network by a facility system status monitoring application that executes on a dedicated device from a remote system monitoring service. The system status in such embodiments provides an indicator of an overall system status for a facility based on results of a system audit performed over a second network by the remote system monitoring service and typically includes consideration of a status of each of a plurality of devices deployed within the facility. However, some non-critical devices and systems may not directed affect the status, while other critical devices and system may directed affect the status when they are down or experiencing certain types of errors. The method 400 further includes presenting 404 an interface on the dedicated device including an indicator of the overall system status of the facility based on the received system status data.

In some embodiments of the method 400, the first network is a wireless data service network distinct from the second network which, in some embodiments, is a standard network utilized for standard network traffic at the facility.

Figure 5:
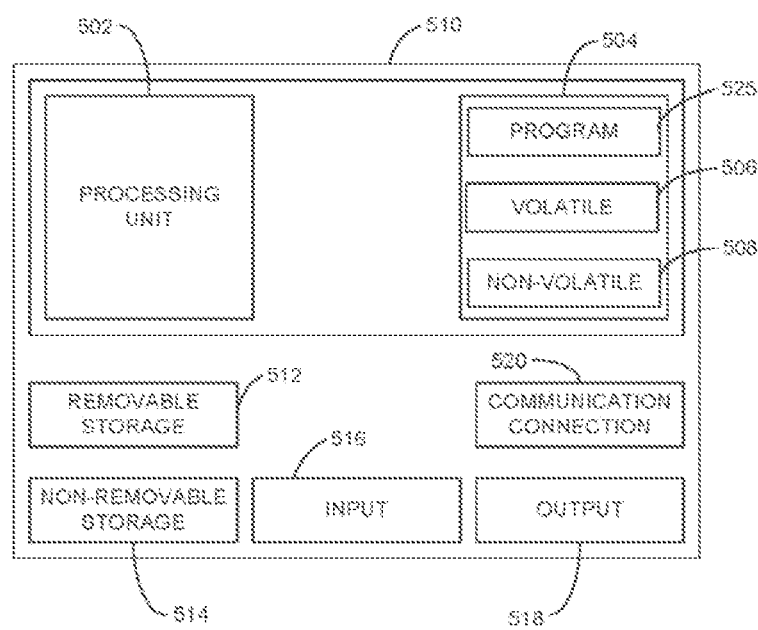
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are sometimes generally and collectively referred to as mobile devices. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method, comprising:
    obtaining statuses from a plurality of devices associated with a first network;
    calculating an overall system status for the first network based on the statuses; and
    providing the overall system status to a monitoring application over a second network.

2. The method of claim 1, wherein obtaining further includes obtaining the statuses based on a request received over the second network.

3. The method of claim 1, wherein obtaining further includes obtaining audit data from each of the devices with the corresponding statuses.

4. The method of claim 2, wherein obtaining the audit data further includes triggering an audit on each of the respective devices that provides the audit data.

5. The method of claim 1, wherein obtaining further includes invoking an agent on each of the respective devices to return the corresponding status of the corresponding device.

6. The method of claim 5 further comprising flagging certain devices of the devices whose corresponding agents failed to return corresponding statuses.

7. The method of claim 6, wherein calculating further includes assigning a negative device status for the certain devices when calculating the overall system status for the first network.

8. The method of claim 1, wherein obtaining further includes identifying the first network as a local-area network of a facility.

9. The method of claim 8, wherein identifying further includes identifying the facility as a restaurant.

10. The method of claim 1 further comprising, providing the overall system status for the first network to a management application of a certain device of the devices over the first network.

11. The method of claim 1, wherein calculating further includes calculating the overall system status based on a type of device associated with each of the respective devices and the corresponding status obtained from the corresponding device.

12. A method, comprising: requesting, over a first network, an overall system health status from a server, wherein the overall system health status associated with a plurality of devices of a second network; and receiving, over the first network, the overall system health status based on the requesting.

13. The method of claim 12, wherein requesting further includes causing the server to poll the devices for individual statuses based on the requesting.

14. The method of claim 13, wherein causing the server further includes causing the server to initiate audits on each of the respective devices based on the requesting.

15. The method of claim 14, wherein receiving further includes presenting the overall health status for the devices as a single indicator within an interface.

16. The method of claim 12 further comprising, processing the method on a management device associated with a facility that includes the devices connected to the second network.

17. The method of claim 13, wherein requesting further includes automatically generating the requesting based on activation of a touch option from an interface associated with the management device.

18. The method of claim 13, wherein requesting further includes automatically generating the requesting based on activation of a dedicated button pressed on the management device.

19. A system, comprising:
    a server comprising a first processor;
    a management device comprising a second processor;
    the second processor performs first operations comprising:
        issuing a system status request to the first processor of the server; and
        presenting a system status indicator received from the first processor of the server based on the issuing of the system status request; and
    the first processor performs second operations comprising:
        receiving the system status request over a first network from the second processor of the management device;
        obtaining statuses from devices over a second network;
        calculating the system status indicator from the statuses; and
        providing the system status indicator over the first network to the second processor of the management device.

20. The system of claim 19, wherein the first network includes the devices of a facility connected to the second network, wherein the facility is a restaurant, and wherein the devices are terminals associated with the restaurant.

* * * * *